(12) United States Patent
Kailas et al.

(10) Patent No.: US 7,454,597 B2
(45) Date of Patent: Nov. 18, 2008

(54) COMPUTER PROCESSING SYSTEM EMPLOYING AN INSTRUCTION SCHEDULE CACHE

(75) Inventors: Krishnan K. Kailas, Tarrytown, NY (US); Ravi Nair, Briarcliff Manor, NY (US); Sumedh W. Sathaye, Cary, NC (US); Wolfram Sauer, Austin, TX (US); John-David Wellman, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 11/618,948

(22) Filed: Jan. 2, 2007

(65) Prior Publication Data

US 2008/0162884 A1  Jul. 3, 2008

(51) Int. Cl.
*G06F 9/38* (2006.01)
(52) U.S. Cl. ............... 712/206; 712/213; 712/215; 712/240
(58) Field of Classification Search ............... 712/206, 712/207, 213, 214, 215, 240; 711/123
See application file for complete search history.

(56) References Cited

U.S. PATENT DOCUMENTS 5,812,810 A    9/1998  Sager
6,351,802 B1*  2/2002  Sheaffer ............... 712/215
6,704,861 B1   3/2004  McKeen et al.

(Continued)

OTHER PUBLICATIONS

Black et al., "The Block-Based Trace Cache", Proceedings of the 26th International Symposium on Computer Architecture, IEEE, May 2-4, 1999, pp. 196-207.*

Talpes et al., "Execution Cache-Based Microarchitecture for Power-Efficient Superscalar Processors"; IEEE Transactions on Very Large Scale Integration (VLSI) Systems, Jan. 2005, pp. 14-26.*

(Continued)

*Primary Examiner*—William M Treat
(74) *Attorney, Agent, or Firm*—Cantor Colburn LLP; Mark Wardas

(57) ABSTRACT

A processor core and method of executing instructions, both of which utilizes schedules, are presented. Each of the schedules includes a sequence of instructions, an address of a first of the instructions in the schedule, an order vector of an original order of the instructions in the schedule, a rename map of registers for each register in the schedule, and a list of register names used in the schedule. The schedule exploits instruction-level parallelism in executing out-of-order instructions. The processor core includes a schedule cache that is configured to store schedules, a shared cache configured to store both I-side and D-side cache data, and an execution resource for requesting a schedule to be executed from the schedule cache. The processor core further includes a scheduler disposed between the schedule cache and the cache. The scheduler creating the schedule using branch execution history from a branch history table to create the instructions when the schedule requested by the execution resource is not found in the schedule cache. The processor core executes the instructions according to the schedule being executed. The method includes requesting a schedule from a schedule cache. The method further includes fetching the schedule, when the schedule is found in the schedule cache; and creating the schedule, when the schedule is not found in the schedule cache. The method also includes renaming the registers in the schedule to avoid false dependencies in a processor core, mapping registers to renamed registers in the schedule, and stitching register values in and out of another schedule according to the list of register names and the rename map of registers.

10 Claims, 5 Drawing Sheets

U.S. PATENT DOCUMENTS

| | | |
|---|---|---|
| RE38,599 E | 9/2004 | Tremblay |
| 6,892,293 B2 | 5/2005 | Sachs et al. |
| 2002/0144088 A1 | 10/2002 | Mohamed et al. |
| 2003/0200396 A1 | 10/2003 | Musumeci |
| 2004/0148489 A1 | 7/2004 | Damron |
| 2004/0268098 A1 | 12/2004 | Almog et al. |
| 2005/0005084 A1 | 1/2005 | Burger et al. |

OTHER PUBLICATIONS

Ravi Nair et al.; "Exploiting Instruction Level Parallelism in Processors by Caching Scheduled Groups;" ACM 0-89791-901-7/97/0006; 1997; pp. 13-25.

Eric Rotenberg et al.; "Trace Cache: A Low Latency Approach to High Bandwidth Instruction Fetching;" Apr. 11, 1996.

* cited by examiner

ORDER VECTOR: (0, 3, 8, 1, 4, 9, 2, 5, 10, 6, 11, 7, 12, 13)

COMPUTER PROCESSING SYSTEM EMPLOYING AN INSTRUCTION SCHEDULE CACHE

GOVERNMENT INTEREST

This invention was made with Government support under contract No.: NBCH3039004 awarded by Defense Advanced Research Projects Agency (DARPA). The government has certain rights in this invention.

BACKGROUND OF THE INVENTION

1. Field of the Invention

The present invention relates to a computer processing system and particularly to an instruction schedule cache, which is a type of an instruction cache that holds schedules of instructions for future execution, such as out-of-order execution, multi-threaded execution (simultaneous or non-simultaneous), in-order execution, VLIW execution, data-flow execution, etc.

2. Description of Background

Before our invention a typical processor utilized register-renaming to break false data dependences (anti- and output dependences), employed multiple-instruction fetch, decode, rename, dispatch, and issue, implemented pipelining and concurrent execution of instructions in multiple units, required a mechanism to recover the program-order semantics in applying the changes to the processor state after the instructions finish their execution, and provided for the simultaneous retirement of multiple instructions, in which the architected state of the machine was modified to reflect the status of computation, in a processor cycle. All these features, and more, lead to designs that are complex in nature. The inherent complexity of the design, combined with the limitations of implementation technologies (silicon-based, for example), lead to designs that are hard to operate, correctly, at higher operating frequencies. Even if a processor could operate correctly at high frequencies, the required supply voltage will be higher, and/or the total amount of logic will be larger, which raises yet another problem: one of high power consumption, and a related problem of efficient heat dissipation.

Applications vary in the amount of fine-grained, instruction-level parallelism (ILP) they possess. Some applications possess almost no instruction-level parallelism. The bulk of the computation occurs within a tight data-dependence chain. Such applications can often run very efficiently in high throughput modes, in which high processor frequency, combined with deeper pipelines, but almost no hardware support to find and expose instruction-level parallelism is provided. Other workloads are ILP workloads i.e. in a single-thread of execution; there is inherently a higher amount of parallelism available for the hardware to exploit. Such applications are best suited for processor designs which may perhaps have a somewhat lower frequency, but exhibit a higher degree of superscalarity, thus carrying out more (parallel) work per cycle.

Most of the present processor designs tend to target one or the other type of applications. Either the processor is a large, complex design and does an excellent job of extracting the ILP (when available), or it is a design that is excellent at efficiently running a tight data-dependence chain application, by virtue of being a simple pipeline that balances the latencies of execution with the latencies of memory access. The ILP-focused designs do an excellent job of extracting the ILP when ILP is available, but such machines also try to extract ILP when it is not available, e.g. in tight data-dependence chains. The effort spent trying to extract and exploit ILP, in an application that contains little or no ILP, is essentially futile. On the other hand, designs that are focused on efficiently executing a tight data-dependence chain application, when presented with applications that contain high amounts of ILP, fail to take advantage of the ILP because they are not well equipped to identify or exploit available workload ILP.

SUMMARY OF THE INVENTION

The shortcomings of the prior art are overcome and additional advantages are provided through the provision of a novel processor core and method of executing instructions.

The processor core includes a schedule cache that is configured to store schedules. Each of the schedules includes a sequence of instructions, an address of a first of the instructions in the schedule, an order vector of an original order of the instructions in the schedule, a list of register names used but not defined in the schedule, a list of registers defined in the schedule, and a rename map of register names for each register in the list of registers defined in the schedule. The schedule exploits instruction-level parallelism by providing for the execution of instructions out-of-order. The processor core further includes a shared cache; configured to store both I-side and D-side cache data and an execution resource that will request a schedule, to be executed on the execution resource, from a schedule cache. The processor core still further includes a scheduler disposed between the schedule cache and the cache. The scheduler creates a schedule, using branch execution history from a branch history table to construct the instructions sequence, when the schedule requested by the execution resource (processor) is not found in the schedule cache. The processor core itself executes the instructions, according to the schedule being received from the schedule cache.

The method includes requesting a schedule from a schedule cache. The schedule includes a sequence of instructions, an address of a first of the instructions in the schedule, an order vector indicating the original (program-specified) order of the instructions in the schedule, a list of registers names used but not defined in the schedule, a list of registers defined in the schedule, and a rename map of register names for each register in the list of registers defined in the schedule. The schedule exploits instruction-level parallelism by supporting the out-of-order execution of instructions. The method further includes fetching the schedule, when the schedule is found in the schedule cache; and creating the schedule, when the schedule is not found in the schedule cache. The method also includes renaming the registers in the schedule to avoid false dependencies in a processor core, mapping registers to renamed registers in the schedule, and stitching register values in and out of another schedule according to the list of register names used but not defined in the schedule, list of registers defined in the schedule, and the rename map of register names.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

As a result of the summarized invention, technically we have achieved a solution that provides the capability to efficiently execute both types of applications: the processor core is designed as a good execution platform for applications that have limited or no ILP. This processor core is augmented by the schedule cache, which provides a means for the processor core to develop and exploit instruction execution schedules such that the instructions in a schedule cache can exploit available workload ILP. Thus, these code schedules, held in the schedule cache, contain instructions that are either unordered with respect to each other, or re-ordered so as to expose the inherent instruction-level parallelism. A processor core that utilizes a schedule cache is expected to be of much lower complexity than a full out-of-order superscalar (ILP-focused) processor design, thus making it a hardware design of higher efficiency. At the same time, it is expected to be able to provide most, if not all, of the performance advantages of a complex out-of-order superscalar machine when executing applications with high ILP.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1A:
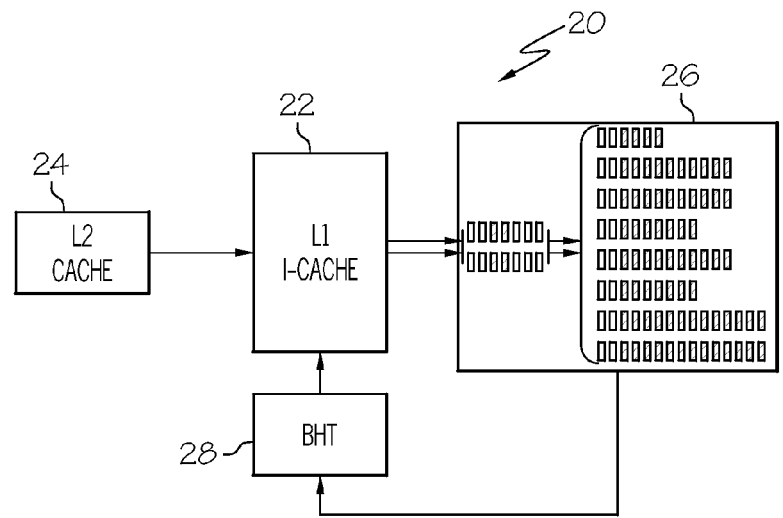
FIG. 1A illustrates diagrammatically one example of a current processor core.

Turning now to the drawings in greater detail, it will be seen that in FIG. 1A there is a present processor core 20 having an instruction memory hierarchy, represented by the L1 I-Cache 22 and L2 Cache 24, an execution resources module 26, and an instruction sequencing controls module 28 (e.g., instruction fetch, etc., denoted by BHT (branch history table)). L2 Cache 24 is in communication with L1 I-Cache 22, which is in communication with the execution resources module 26. The execution resources module 26 is in communication with the instruction sequencing controls module 28, which is in communication with the L1 I-Cache 22. The processor core 20 supports two-way simultaneous multi-threading (SMT), where instructions from two independent threads of execution can be simultaneously executing in the processor core 20 execution resources. During operation, the execution resources module 26 requests a sequence of instructions at a given instruction address (e.g., instruction fetch). Such a request will produce a set of instructions from sequential memory addresses in a program image, starting at the requested address, and continuing to some natural fetch limit (e.g.,. a cache line, a cache sub-line, a maximum total number of instructions fetched per cycle, etc.).

Figure 1B:
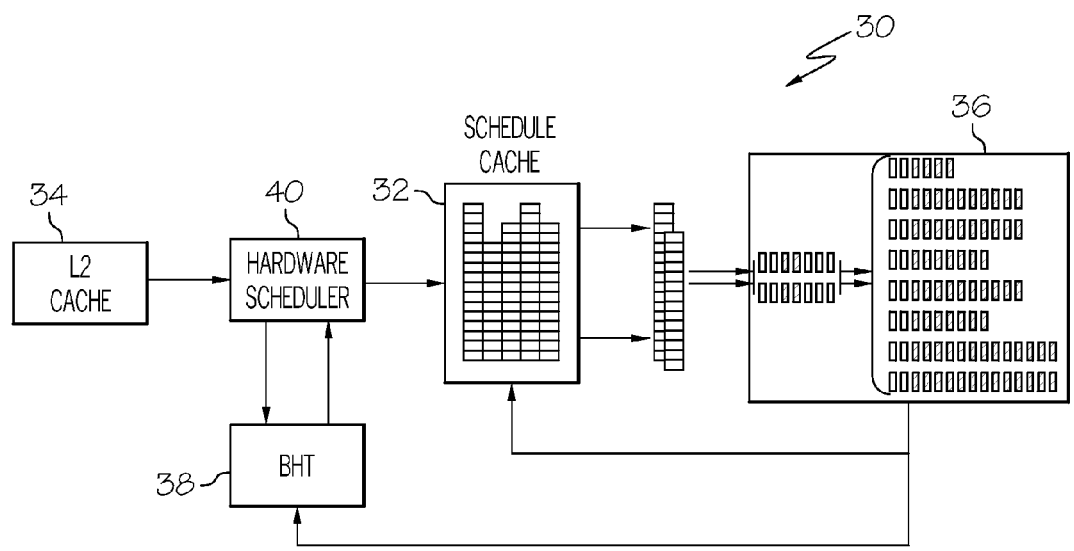
FIG. 1B illustrates diagrammatically one example of a processor core with a schedule cache.

Turning now to FIG. 1B, there is an example shown of a processor core 30 implementing a schedule cache. The processor core 30 has a Schedule Cache 32, an L2 Cache 34, an execution resources module 36, an instruction sequencing controls module 38 (e.g., instruction fetch, etc., denoted by BHT), and a hardware scheduler 40. The L2 Cache 34 is in communication with the hardware scheduler 40, which is in communication with the Schedule Cache 32. The Schedule Cache 32 is in communication with the execution resources module 36, which is in communication with the instruction sequencing controls module 38. The instruction sequencing controls module 38 is in communication with the hardware scheduler 40.

The Schedule Cache 32 holds sequences of instructions called schedules. Since the processor 30 is a 2-way SMT design, schedules belonging to both the (currently active) threads are held in the Schedule Cache 32, and each schedule is marked with its appropriate thread ID.

The hardware scheduler 40 is inserted between the Schedule Cache 32 and the L2 Cache 34. The L2 Cache 34 is a shared cache, i.e., it holds both I-side and D-side cache data, and may also be shared between multiple cores. The hardware scheduler 40 uses branch execution history information (in the BHT) from the instruction sequencing controls module 38 to create new schedules.

It will be noted that the processor core 30 of FIG. 1B utilizes the Schedule Cache 32 instead of the standard, typical I-Cache 22 utilized by the present processor core 20 of FIG. 1A. During operation, the execution resources module 36 requests a sequence of instructions at a given instruction address (i.e., instruction fetch) from the Schedule Cache 32, to look up a schedule associated with that fetch address. If a schedule is found in the Schedule Cache 32, an entire schedule line is fetched from the Schedule Cache 32 which then supplies instructions to the processor core 30 front-end for multiple processor cycles (i.e. into the execution resources module 36); the number of cycles depends on a ratio of the cache line to the transfer size, and it is expected that individual schedules will be up to ~24-32 instructions in length.

When a schedule is not found in the Schedule Cache 32, the hardware scheduler 40 is invoked. The hardware scheduler 40 queries the BHT at the instruction sequencing controls module 38 and initiates transfer of requisite instructions from the L2 Cache 34. Instructions arriving from the L2 Cache 34 are processed in a predicted basic block order. When processing the instructions, the hardware scheduler 40 performs partial register renaming to expose the available instruction-level parallelism (ILP) in the code, and instruction re-ordering to present the instructions to the processor core 30 so that the (in-order) core can naturally exploit the exposed ILP without requiring execution hardware to dynamically reschedule the instruction stream. Conceptually, the design percolates independent instructions "upward" or to the "front" of the schedule so that they will be discovered early on by the instruction dispatch/issue logic.

Figure 2:
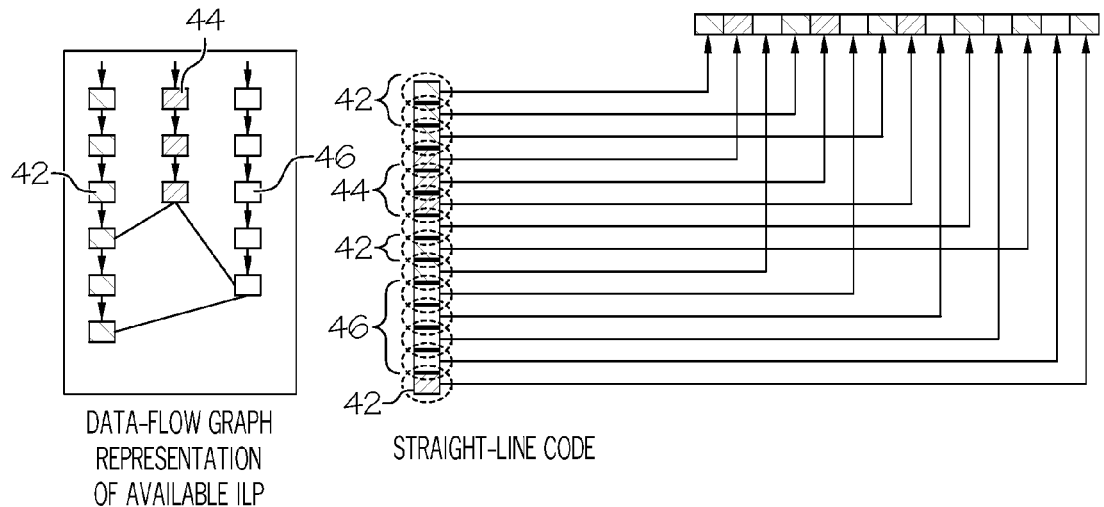
FIG. 2 illustrates diagrammatically one example of an instruction schedule in the schedule cache.

Turning now to FIG. 2, there is an example shown of an instruction schedule. Since the Schedule Cache 32 is employed primarily to exploit the available ILP in a workload, a typical data-flow graph of a workload with some available ILP is shown.

In a typical workload, there are multiple, semi-independent chains of dependences in the data-flow graph. A schedule groups together those instructions that are identified as data-independent of one another. It will be appreciated that the data independence may be exposed only after the step of register renaming.

No explicit marking is required within the schedule to identify instruction groups or bundles (i.e., instruction groups that are data-independent); the simple proximity and reordering of the instructions, i.e., the fact that the independent instructions are moved "forward" or percolated "upwards" in the schedule, is sufficient to expose a higher degree of ILP to the simple instruction dispatch/issue logic in the processor core 30 allowing it to better exploit their independence. Instruction dependencies through memory are detected and handled at run-time by the (in-order) processor using the standard techniques, such as load/store queues. The load/store queue employs program order information specified in the instruction order vector, as discussed in more detail below.

In the present example, three independent instructions 42, 44, 46, each belonging to a different dependence chain, are brought together as the first instructions in a schedule. Such straight-line code (before register renaming), would have taken the instruction dispatch/issue logic a scheduling window of nine entries (in present processor core configurations) to discover all three of these independent instructions, because the ordering of the straight-line code often places several dependent operations in close proximity. The processor core 30 executes the instruction sequence received according to the exposed parallelism of the instructions that are close in the instruction schedule proximity; the original code sequence does not provide particular proximity of independent instructions, while the Schedule Cache 32 reorders the instructions to put independent instructions in close proximity, allowing the processor core 30 to more readily exploit the proximal independent instructions.

Figure 3:
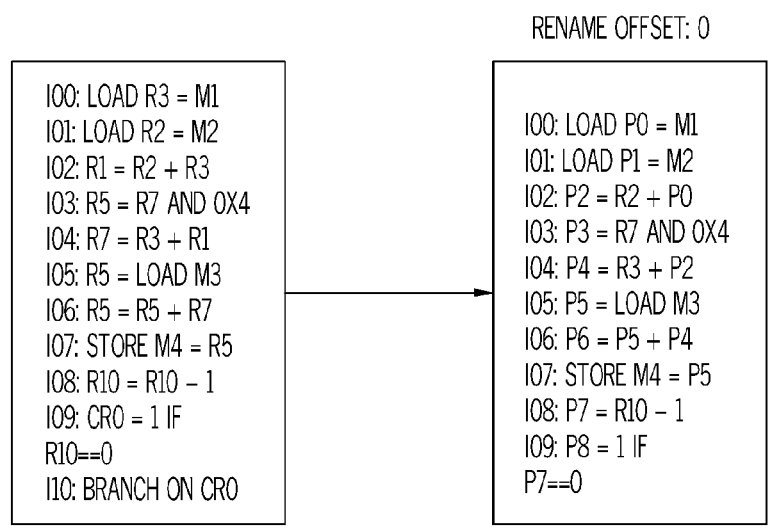
FIG. 3 illustrates one example of partial resister renaming in the schedule cache.

Turning now to FIG. 3, there is an example shown of register renaming to expose ILP, which is carried out to break the false dependences in code (i.e. the anti- and output-dependences are broken). Every register target in an instruction is renamed to a physical register name, but renaming is based on an offset value of 0 (e.g., instruction I00) with subsequent renames incrementing this offset value (e.g. instruction I01 uses p1). Since the exact physical register name when the schedule is launched for execution in the processor core execution resources module 36 is unknown at the time the schedule is constructed, the step of renaming is carried out at offset 0. At launch time, each register name is simply incremented by the then available actual physical register offset.

For register source operands, only those register names that have been renamed as target registers in the same schedule are renamed to the offset-based rename value (e.g., in FIG. 3, operand r3 in the original instruction I02 was renamed by instruction I00). All other source register operands are declared use-in or live-in registers, and are filled at the time the schedule is launched for execution (e.g., in FIG. 3, operand r2 in instruction I02). The renaming is carried out in such a way as to minimize the number of rename registers used by exploiting reuse of rename registers. This offline-renaming scheme implies that a given Schedule Cache 32 segment will need a fixed number (equal to the number of rename registers used by the schedule cache segment) of contiguous free rename registers to execute. With the addition of a mapping table in the processor core 30, this requirement of contiguous free rename registers could also be relaxed (though at the cost of higher processor core hardware complexity).

Figure 4:
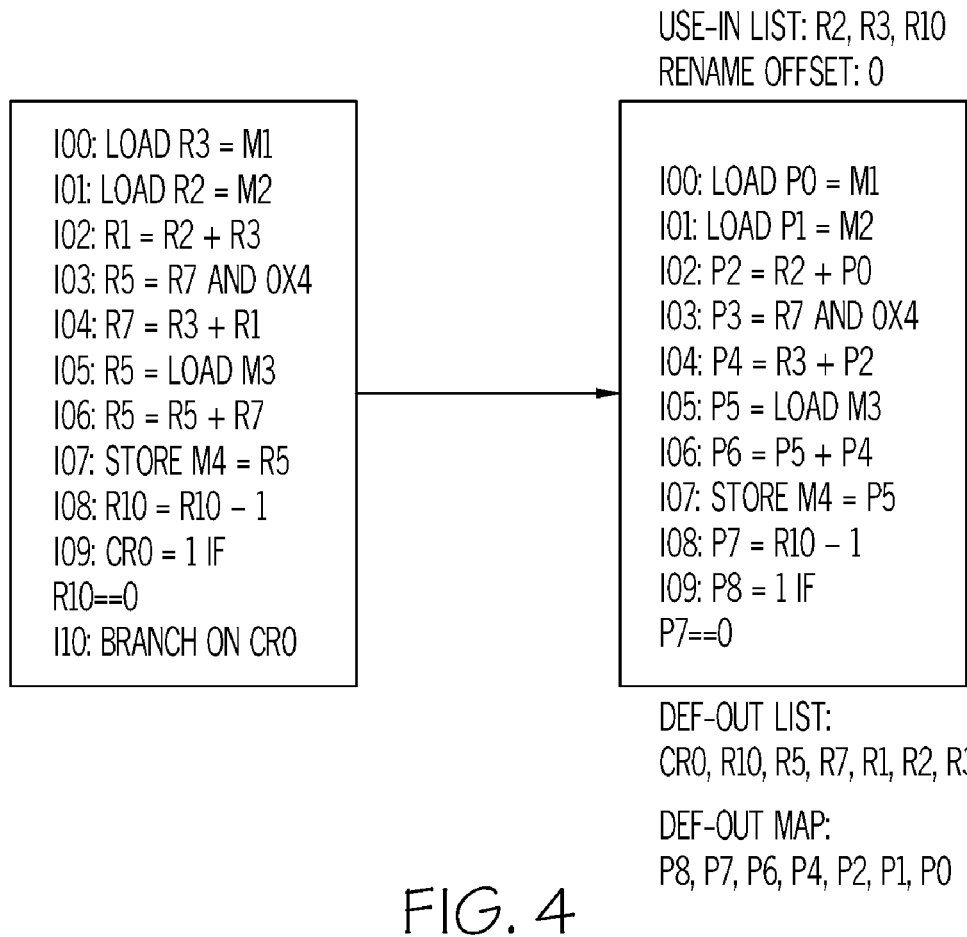
FIG. 4 illustrates one example of def-use lists for a schedule.

Turning now to FIG. 4, there is an example shown that once partial register renaming is completed, the scheduler is aware of the use-in values and the def-out values. For each schedule, a list of use-ins and a list of def-outs are saved. These lists are used for the purpose of "schedule stitching" when a new schedule is launched. Also maintained is a rename map for the def-outs; the map conveys to the processor front-end the corresponding physical names (offset-based) of the target registers in the schedule.

Rename maps are maintained until the end of the schedule. To reduce the complexity of the implementation, unlike the DIF processor and modular processing systems (MPS) approaches, rename maps are not developed for each of the side-exits from the schedule. When a side-exit is taken, leaving from the interior of a schedule (and thereby implying an incorrect assumption was made regarding the behavior of that branch in selecting this schedule), the current schedule is invalidated, recovering the pre-schedule state (which resides in the architected register file). The correct schedule is then selected (knowing the correct behavior of that branch) and launched, it is therefore stitched with the contents of the architected register file (rather than the working state of the future file based on the side-exit out of the schedule that was taken). This approach, of not applying the in-progress results of the future file to the architected register file until the schedule is fully executed, guarantees in-order of commit of register values to the architected register file, and simplifies the handling of these side-exit exception cases.

Figure 5:
FIG. 5 illustrates one example of an order vector for a schedule.

Turning now to FIG. 5, there is an example shown that each schedule in the Schedule Cache 32 maintains an order vector for the instructions in the schedule. In the vector, the original relative order of the instruction, as it appeared in the straight-line code, is encoded. The order vector is used when the schedule is launched for execution. For each instruction that is dispatched, an entry in the instruction order buffer is allocated to that instruction, such that the entry number corresponds to the original position of the instruction in the schedule.

The instruction commit stages of the pipeline retire instructions in the same order as they appear in an instruction-ordering buffer. Thus, the update of architected state is in the same order as the programmer originally intended in the straight-line code.

The encoding of the original instruction position requires a fair number of bits. For example, for a schedule of length 32 instructions, a simple encoding would require 5 bits to represent the order accurately.

Figure 6:
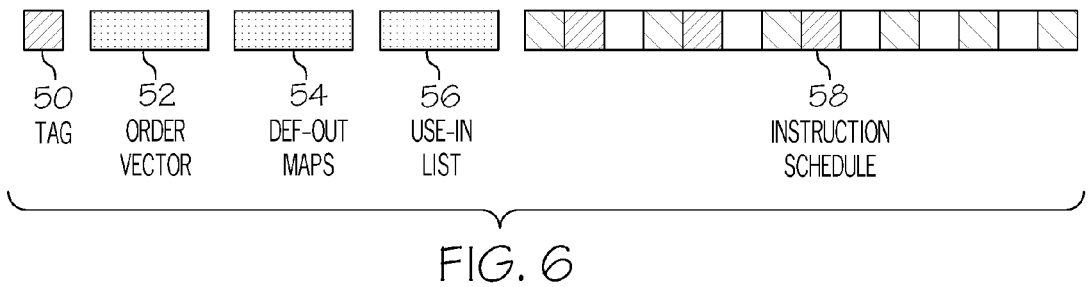
FIG. 6 illustrates one example of a line in the schedule cache.

Turning now to FIG. 6, there is an example shown of the contents of each line in the Schedule Cache 32. A Tag 50 identifies a schedule uniquely. The Tag 50 consists of an address of the first instruction in the schedule, and may also include the predicted branch behavior in the schedule. An Order Vector 52 encodes the original instruction ordering in the schedule. A Def-out Maps 54 is the rename map of registers (offset-based) for each register defined in the schedule, and hence presumed live out of the schedule. A Use-in List 56 is a list of architected register names that are used in the schedule, before they are defined in the same schedule. An Instruction Schedule 58 is the schedule of instructions itself.

Figure 7:
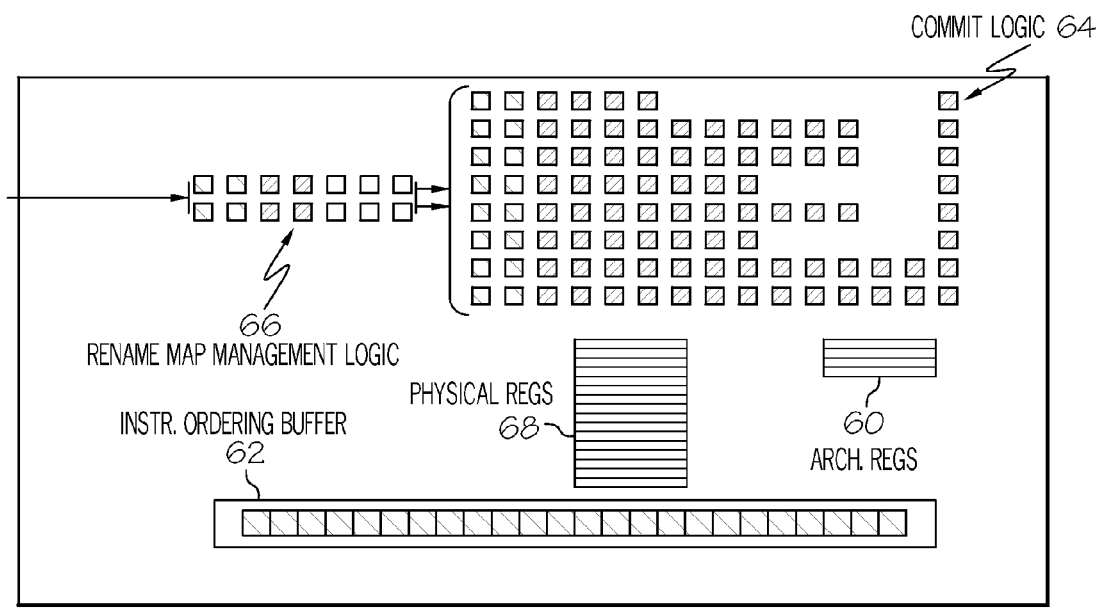
FIG. 7 illustrates one example of a processor core with a schedule cache.

Turning now to FIG. 7, there is an example shown of the processor core with the schedule cache to support the out-of-order program execution. With a thread level parallelism (TLP) workload executing on the processor core (i.e., when the processor core is in the TLP morph), these resources will be turned off. A future register file is configured to allow for more or less exploitation of the ILP in a workload. Execution occurs from and into the future register file; register values are committed in program order into an architected register file 60, present in the processor core. An instruction ordering buffer 62 is provided for the instructions. Instruction commit stages 64 in the pipeline update the architected state once an instruction reaches the end of the instruction-ordering buffer. The underlying TLP processor core does not require this separate, re-ordering commit pipeline stage, since the register state updates reach the end of the pipeline in the accurate program order by design; a re-ordering commit stage in necessary when results can be generated out of program order, as provided by the rescheduled instruction stream of the schedule, and where precise exceptions are required by the instruction set architecture. Rename map management logic 66 "stitches" the next schedule with the currently executing schedule. A Load/Store buffer 68 in the in-order TLP processor core dynamically disambiguates loads with stores that are not yet complete. Since the schedule cache 32 enhances the extraction of ILP from the code, it may be desirable to enable a larger load/store buffer when operating in the ILP mode.

Figure 8:
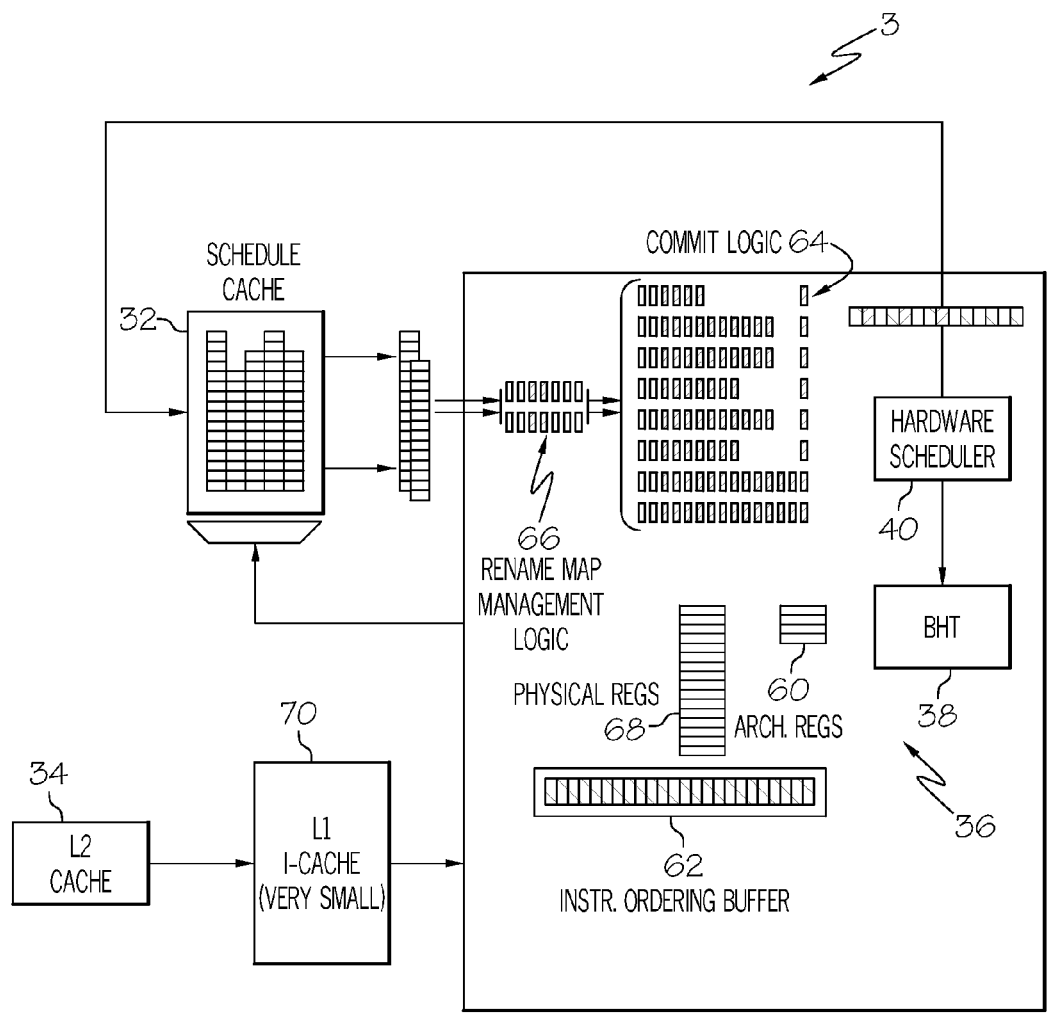
FIG. 8 illustrates one example of a processor core with a schedule cache.

Turning now to FIG. 8, there is an example shown of an alternative embodiment of the schedule cache 32. Instead of placing the hardware scheduler 40, which creates schedules when invoked, between the L2 cache and the processor core 30 front-end, it is incorporated in the backend of the processor core 30. Accordingly, when a schedule is not found in the schedule cache 32, the processor core 30 could revert (temporarily) to a TLP mode of operation while a schedule is being formed. Instructions are executed in-order, and committed in-order, and upon commits, are consumed by the hardware scheduler 40 to create a new schedule. The front-end fetches instructions from an instruction cache 70 provided expressly for the purpose of aiding the creation of schedules in this fashion. The scheduler could also make use of any branch history available from the BHT 38.

When the processor is in schedule-formation mode, the scheduler creates new schedules. As instructions execute and commit their results to architected state, they are captured by the scheduler, along with as much information about their behavior during execution. Based on this record of execution and history of behavior, the scheduler makes decisions about path directions to take and form schedules. One advantage of this style of implementation is that the processor core 30 is not idle when a new schedule is being created—the program is executing, and feeding the scheduler. The overlap of execution with schedule creation is expected to result in savings. The other advantage is more from the point-of-view of physical placement of core resources. The BHT 38 is tightly coupled with the core pipeline. Locating the BHT 38 in the vicinity of the hardware scheduler 40 improves access latency.

The schedule cache 32 exploits the code reuse in programs. In other words, if a path of execution in the program executes multiple times, then the task of extracting the instruction-level parallelism in the path can be done once with the resulting modified path cached in the schedule cache 32. The modified path is then re-used multiple times on subsequent executions. Thus, the benefits of out-of-order execution for programs that exhibit ILP are achieved at low-complexity, and with a simple in-order execution core.

The schedule cache 32 also benefits from the fact that a schedule can be accessed every n processor cycles, for n>1, unlike the normal instruction cache. This helps save power, and it can be clocked slower (2n, 3n, times slower than the processor), which opens a lot of implementation alternatives for the schedule cache 32. For example, a larger schedule cache 32 can then be accommodated since it can be clocked slower than the processor core.

It is expected that for ILP workloads, there would be significant performance gain from the schedule cache 32. When in TLP morph, the processor core 30 will turn off the supporting hardware structures such as the future register file, instruction ordering buffer, the explicit commit stages etc. Further, in the TLP morph, the processor core 30 would use the data array of the schedule cache 32 as the data array of the normal instruction cache. Alternatively, the processor could use the schedule cache 32 structures and associated cache resources as a trace cache. As discussed above, owing to the high clock-frequency and deep pipelines in many simple, in-order modern processors, a trace cache-like structure will be important.

If the workload does not have significant available ILP, the schedule cache 32 will provide correct execution. The schedule cache 32 and the associated hardware support structures are preferably $V_{dd}$-gated in order to save power, when the processor core is executing non-ILP workloads. On the other hand, when executing a non-ILP workload, the data array of a schedule cache 32 could be used as the data array of a normal instruction cache data array, which could also be configured to operate as a trace cache, using the very same hardware resources as the schedule cache 32.

While this work has been primarily described in the context of an in-order processor, the capabilities provided by a schedule cache, including the ability to reorder the code as it is presented to the processing core from the instruction memory, the potential to alter the schedule across a fairly large window of instructions, and the ability to schedule across branch instructions, could provide real performance benefits for other types of processors, including dynamic out-of-order superscalar cores.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of executing instructions, comprising:
    requesting a schedule from a schedule cache, the schedule includes a sequence of instructions, an address of a first of the instructions in the schedule, an order vector of an original order of the instructions in the schedule, a list of register names used but not defined in the schedule, a list of registers defined in the schedule, and a rename map of register names for each register in the list of registers defined in the schedule, the schedule exploiting instruction-level parallelism in executing out-of-order instructions;

if the schedule is found in the schedule cache, fetching the schedule;

if the schedule is not found in the schedule cache, creating the schedule;

renaming the registers in the schedule to avoid false dependencies in a processor core;

mapping registers to renamed registers in the schedule; and stitching register values in and out of another schedule according to the list of register names used but not defined in the schedule, list of registers defined in the schedule, and the rename map of register names.

2. The method of claim 1 wherein the schedule further includes side cache data.

3. The method of claim 1 wherein creating the schedule uses branch execution history.

4. The method of claim 1 further comprises:

selecting another schedule for a side-exit from the schedule, that will result in a correct behavior for a resulting branch.

5. The method of claim 1 wherein the renaming of registers comprises an offset-based physical register rename method.

6. A processor core including:

a schedule cache configured to store schedules, each of the schedules includes a sequence of instructions, an address of a first of the instructions in the schedule, an order vector of an original order of the instructions in the schedule, a list of register names used but not defined in the schedule, a list of registers defined in the schedule, and a rename map of register names for each register in the list of registers for each register in the schedule; the schedule exploiting instruction-level parallelism in executing out-of-order instructions;

a shared cache configured to store both I-side and D-side cache data;

an execution resource for requesting a schedule to be executed from the schedule cache;

a branch history table containing branch execution history;

a scheduler disposed between the schedule cache and the cache, the scheduler creating the schedule using branch execution history when the schedule requested by the execution resource is not found in the schedule cache; and wherein the processor core executes the instructions according to the schedule being executed.

7. The processor core of claim 6 wherein the scheduler is disposed at the front end of the processor core between the schedule cache and the shared cache.

8. The processor core of claim 6 wherein the scheduler disposed at the backend of the processor core in communication with the schedule cache.

9. The processor core of claim 6 wherein the processor core supports multi-way simultaneous multithreading.

10. The processor core of claim 6 wherein the processor core executes the instructions according to the schedule being executed further includes:

renaming the registers in the schedule to avoid false dependencies in a processor core;

mapping registers to renamed registers in the schedule; and stitching register values in and out of another schedule according to the list of register names used but not defined in the schedule, list of registers defined in the schedule, and the rename map of register names.

* * * * *